United States Patent
Bayer et al.

(10) Patent No.: US 7,491,755 B2
(45) Date of Patent: Feb. 17, 2009

(54) CELLULOSE ETHER COMPOSITION FOR THE EXTRUSION OF MINERAL SHAPED BODIES AND ALSO A PROCESS FOR THE EXTRUSION OF MINERAL SHAPED BODIES USING THIS CELLULOSE ETHER COMPOSITION

(76) Inventors: Roland Bayer, Hannoversche Str. 6, 29664 Walsrode (DE); Frank Höhl, Pfingsthorn 6, 29643 Neuenkirchen (DE); Hartwig Schlesiger, Vogteistr. 20, 29683 Bad Fallingbostel (DE); Arne Henning Kull, Fichtenring 16, 29699 Bomlitz (DE); Jörn Pannek, Blumenlage 61, 29683 Bad Fallingbostel (DE); Jürgen Engelhardt, Vierder Weg 12, 29683 Bad Fallingbostel (DE); Burkhard Kressdorf, Von dem Hofe 5, 29683 Bad Fallingbostel (DE)

( * ) Notice: Subject to any disclaimer, the term of this patent is extended or adjusted under 35 U.S.C. 154(b) by 270 days.

(21) Appl. No.: 10/914,470

(22) Filed: Aug. 9, 2004

(65) Prior Publication Data
US 2005/0080167 A1    Apr. 14, 2005

(30) Foreign Application Priority Data
Aug. 12, 2003  (DE) ............................. 103 37 012

(51) Int. Cl.
C04B 24/26    (2006.01)

(52) U.S. Cl. ............................................. 524/5; 524/4

(58) Field of Classification Search .................. 524/4–5, 524/35–46
See application file for complete search history.

(56) References Cited

U.S. PATENT DOCUMENTS

| 4,487,864 A | | 12/1984 | Bermudez et al. ............... 524/2 |
| 4,846,889 A | | 7/1989 | Meyer ........................ 106/115 |
| 5,258,429 A | * | 11/1993 | Kniewske et al. ............. 524/31 |
| 5,387,626 A | * | 2/1995 | Bohme-Kovac et al. ....... 524/35 |
| 5,432,215 A | * | 7/1995 | Girg et al. ..................... 524/28 |
| 2005/0241543 A1 | * | 11/2005 | Hagen et al. ................. 106/805 |

FOREIGN PATENT DOCUMENTS

| CA | 2 382 274 | 3/2001 |
| JP | 4-144949 | 5/1992 |
| JP | 4-164604 | 6/1992 |
| JP | 4-240144 | 8/1992 |
| JP | 10-152357 | 6/1998 |

OTHER PUBLICATIONS

Chemical Abstracts + Indexes, American Chemical Society. Columbus, US, 1987, XP000183898.

* cited by examiner

Primary Examiner—Peter Szekely

(57) ABSTRACT

A description is given of a cellulose ether composition as additive for the extrusion of mineral masses which comprises 70 to 99.9% by weight of cellulose ether and 0.1 to 30% by weight of superabsorbent polymer, as well as a process for the extrusion of mineral masses using these compositions as additive.

8 Claims, No Drawings

CELLULOSE ETHER COMPOSITION FOR THE EXTRUSION OF MINERAL SHAPED BODIES AND ALSO A PROCESS FOR THE EXTRUSION OF MINERAL SHAPED BODIES USING THIS CELLULOSE ETHER COMPOSITION

BACKGROUND OF THE INVENTION

1. Field of the Invention

The present invention relates to additives which comprise a cellulose ether composition for use as water-retention agent, plasticizer and lubricant in the extrusion of mineral masses. In addition it relates to the use of this cellulose ether composition in building material systems and also to a process for the extrusion of mineral masses using these additives. The use of this methylcellulose composition leads, in the extrusion process, to improved process properties and to a higher surface quality of the extruded body.

2. Brief Description of the Prior Art

The extrusion of mineral masses has been employed industrially for many years. Of particular interest here is the extrusion of cement-bonded masses.

Cement extrusion is a process for shaping pasty cementitious mixtures into any desired profiles by pressing them through a die mouth. The elements obtained in this manner may be used in many ways, in particular in construction applications. Here they can firstly replace cement masses which have been cast hitherto, but secondly, they make accessible profile shapes which are not accessible by the conventional process of casting. Examples of extruded building elements range from small angle profiles which have a width of only a few centimeters up to large building slabs which can have a width of 60 cm and theoretically any length. Extruded cement masses comprise, as constituents, in principle cement as binder, possibly other binders, aggregates (sands) and/or lightweight aggregates, and cellulose ethers, in particular methylcellulose, as water-retention agent, plasticizer and lubricant.

Methylcellulose in this publication is taken to mean all methyl-group-containing cellulose ethers such as methylcellulose, methyl hydroxyethylcellulose, methyl hydroxypropylcellulose, methyl hydroxyethyl hydroxypropylcellulose, methyl ethylhydroxyethylcellulose and methyl hydroxyethyl hydroxybutylcellulose. Frequently, natural and/or synthetic fibres are also added to the formula. The amount of the methylcellulose or the cellulose ether composition used is generally between 0.5 and 6%, based on the extrusion mass without water.

Whether a mass may be extruded and may be processed to give marketable products is determined by various parameters. The mass must have highly plastic behaviour during the extrusion process and should be able to be discharged with the lowest possible pressure and the highest possible rate homogeneously from the die mouth. Here, the surface of the extruded mass plays a critical role. It should be crack-free and as smooth as possible. Good surface properties are a problem especially after a relatively long extrusion time, since after a relatively long operating period higher temperatures are established through the friction of abrasive mineral particles. The quality of the surface of an extruded mass generally decreases more with higher the temperature of the extruded mass. Extrusion temperatures around 60° C. are considered to be particularly critical. All these problems have been solved only inadequately hitherto.

Numerous patent applications claim additive compositions which are said to beneficially affect various parameters of the extrusion process or properties of the end product. WO 01/16048 A1 claims a mixture of viscosity enhancing agents (including cellulose ethers) and dispersion agents where synergistic effects between the two components reportedly result in a reduction in dosage. As dispersion agent, various sulphonates are claimed. Polymers based on acrylic acid, acrylic esters and other acrylic polymers are mentioned but not specified in more details. These polymers such as polyacrylates, because of their lack of capability for a strong three-dimensional crosslinking, are completely water-soluble and are markedly of lower-molecular-weight than superabsorbers based on polyacrylate. While they can be slightly crosslinked in a linear or branched manner, they always remain completely water-soluble. In a cementitious mortar system such as the abovementioned system of the extruded cement masses, they lead to an unwanted decrease in water requirement. In contrast the use of superabsorbers significantly increases the water requirement. It was therefore not to be expected that superabsorbers, despite their similar chemical composition, improve the extrusion properties of a cement mortar at high temperatures.

EP-A-0 131 090 A1 describes mixtures of water-soluble polysaccharide polymers based on cellulose, guar or starch with a water-swellable but not water-soluble polymer based on a partially hydrolyzed polyacrylamide for use in various building materials (such as cement-bonded tile adhesives and plasters, gypsum-bonded plasters, wallpaper adhesives and concrete). However, only cement-bonded tile adhesives are considered in more detail. Compared with a mixture of a polysaccharide polymer and an uncrosslinked (and water-soluble) polyacrylamide, the mixtures with crosslinked partially hydrolyzed polyacrylamides exhibit a better open time and generally higher tensile bond strengths of the tile adhesive under test. Even for those skilled in the art, it is not at all obvious herefrom that a similar mixture of cellulose ether and superabsorbers improves the surface properties and other properties described in the case of the extruded cementitious mass at relatively high temperatures. The processing temperature of the building materials mentioned in the above-cited EP-A-0 131 090 A1 is generally in the range of room temperature. The high extrusion temperatures do not occur in the case of other extruded masses, for example in the case of clay, or the ceramic cited in EP-A-0 131 090 A1, since in both these cases the friction of the particles against one another is less and thus the heating of the mass is markedly lower. In particular sheet silicates, as are present in clay, have a good lubricating action.

EP-A-327 351 A2 claims a blend of methylcellulose and crosslinked insoluble polyacrylic acid for improving the sag resistance in thin-bed mortars, for example tile adhesives. Here also, it would not be possible for a person skilled in the art to infer surface effects in extruded cement masses either from the effect of improving the sag resistance or from the customary surface temperature of thin-bed mortars.

JP 10-152357 claims extrudable mortars which comprise a redispersible and uncrosslinked synthetic polymer which has been produced by (normal or inverse) emulsion polymerization with the aid of a polymeric protective colloid and a surfactant and has then been dried by a suitable process to give a powder. By adding these redispersible polymers to the mortar mixture, higher bending tensile strengths and lower extrusion pressures are obtained. These products are produced in a different manner from the above-described superabsorbers and, in contrast to superabsorbers, are not crosslinked, even if they can contain acrylate groups. Extrusion properties at elevated temperatures are not described. There is likewise no report of a higher surface quality.

JP 4-164604 claims the use of strongly water-absorbent polymers as additive to extrudable cement masses in dosages of 0.1-2% by weight. In this case, the water-absorbent polymers are used in addition to the methylcellulose used to obtain, via the greatly increased water requirement, lightweight building materials since, after the cement has set, and the mass is dried, the previously swollen polymers leave behind pores. There is no report on extrusion properties at elevated temperatures. Disadvantages, as a result of the high water requirement, are in particular the falling bending strength and compressive strength of materials produced in this manner.

The object therefore underlying this invention is to find a water-retention agent, plasticizer and lubricant which have improved properties with respect to the extrusion process and the surface quality of the extruded profile, in particular at elevated temperatures. Elevated temperatures here are taken to mean temperatures of 30-65° C., and in particular 45-65° C. These improved properties can mean, for example, a lower discharge pressure at the die mouth, a smoother surface of the extrudate, lower crack formation of the extruded profile or a higher extrusion rate.

SUMMARY OF THE INVENTION

It has been found that a cementitious mass at elevated temperatures is extruded better, using an additive comprising a mixture of cellulose ethers and superabsorbent polymers. The pressure at the die mouth of the extruder can be reduced, the surface quality (smoothness, homogeneity) of the extrudate increased and crack formation in the extrudate greatly reduced.

DETAILED DESCRIPTION OF THE INVENTION

The invention, therefore, relates to a cellulose ether composition as additive for the extrusion of mineral masses which comprises 70 to 99.9% and preferably 90.1 to 99.8% by weight of cellulose ether and 0.1 to 30% and preferably 02. to 99.9% by weight of superabsorbent polymer, the % by weight of the individual components totalling 100% by weight in each case. At an assumed cellulose ether usage rate of 1%, this corresponds to a usage rate of superabsorbers (based on all mixture components) of 0.001 to 0.3% by weight, but preferably 0.002 0.0990% by weight.

The extrusion of mineral masses is a process for shaping pasty binder-containing mixtures into any desired profiles by pressing them through a die mouth. The elements obtained in this manner can be used in many ways, in particular in building and industrial applications. These elements can replace cast masses, and also make available profile shapes which are unavailable via the conventional casting process. Examples of extruded elements extend from small angle profiles which have a width of only a few centimeters to large building slabs which can have a width of 60 cm and theoretically any desired length. Extruded masses comprise, in principle, as constituents, at least one binder, in addition aggregates (e.g. sands, mineral flours) and/or lightweight aggregates and also cellulose ethers, in particular methylcellulose, as water-retention agent, plasticizer and lubricant and also if appropriate fibres. Binders here are taken to mean all mineral binders, such as cement, gypsum, dry hydrated lime, burnt lime, clay/loam, silicates, special fly ashes and ceramic binders.

Aggregates here are taken to mean all kinds of sands and stone flours as are customarily used in building materials. These are in particular gravels, sands, chips, ashes and flours based on quartz, limestone (calcium carbonate), dolomite, kaolin, marble, glass, various types of builder's rubble, special fly ashes, clays, bentonites and other sheet silicates. In principle, aggregates of the most varied particle sizes may be extruded, during the preparation of the aggregates, in accord with the profile of requirements, it is possible to combine certain particle fractions with one another in order to establish certain properties in an optimum manner.

Lightweight additives are additives of particularly low density. These can be of mineral origin, for example perlite (expanded clay), expanded glass, expanded calcium silicates or high-porosity natural sands based on quartz or lime, but can also be of organic origin, such as expanded polystyrene, polyurethane foam, cork etc.

Fibres here are taken to mean all types of natural or synthetic fibres, for example fibres based on cellulose, bamboo, coconut, polyethylene, polypropylene, polyamide, polyacrylonitrile, carbon, glass, ceramics and other mineral fibres. Their fibre lengths and fibre thicknesses can be varied over broad ranges to achieve defined product properties.

The cellulose ether composition can comprise, in addition to cellulose ethers, other additives, for example liquefiers/flow agents (for example sulphonates based on melamine or naphthalene and also polyethers), hydrophobizing agents and lubricants (for example poly(ethylene oxide) or related polymers). Cellulose ethers are taken to mean here ionic cellulose ethers such as sulphoethylcellulose or carboxymethylcellulose and salts thereof, e.g. sodium-carboxymethylcellulose, sodium-sulphoethylcellulose, or the respective salts with other cations e.g. potassium or ammonium and the like, or non-ionic cellulose ethers, such as alkylcelluloses, hydroxyalkyl alkylcelluloses or hydroxyalkylcellulose, in particular methylcellulose, methyl hydroxyethylcellulose, methyl hydroxypropylcellulose, hydroxyethylcellulose, ethyl hydroxyethylcellulose, methyl ethylhydroxyethylcellulose, methyl hydroxyethylhydroxypropylcellulose, methyl hydroxyethylhydroxybutylcellulose or mixtures of the abovementioned products.

The viscosities of the abovementioned cellulose ethers are between 400 and 200 000 and preferably—from 10 000 to -100 000-mPas, measured in 2% strength solution at 20° C. in a Haake rotary viscometer.

The superabsorbers are taken to mean here crosslinked organic polymers which, although swellable, are not soluble in water. They swell with water to many times their own weight, in some cases to more than one hundred fold. Chemically, they comprise partially neutralized and crosslinked polyacrylic acids, (partial) hydrolysates of starch-acrylonitrile graft copolymers, (partially) neutralized starch-acrylic acid graft copolymers, (partially) saponified vinyl acetate-acrylic ester copolymers, (partially) hydrolyzed acrylonitrile or acrylamide copolymers, crosslinked products of such hydrolysates and polymers of crosslinked cationic monomers. In detail, in the crosslinked superabsorbent polymers, the following monomers can be present alone or in combination:

Acrylic acid, methacrylic acid, vinylsulphonic acid, styrenesulphonic acid, 2-(meth)acrylamido-2-methylpropanesulphonic acid, 2-(meth)acryloylethanesulphonic acid, 2-(meth)acryloylpropanesulphonic acid and also the salts of the abovementioned acids. In addition (meth)acrylamide, N-ethyl(meth)acrylates, N,N-dimethylaminopropyl(meth)acrylates, N,N-dimethylaminopropyl(meth)acrylamides and also quaternary salts thereof and vinylpyrrolidone. Suitable crosslinkers are, for example, allyl methacrylate, diethylene glycol diacrylate, ethoxylated trimethylolpropanetriacrylate, ethylene glycol diglycidyl ether, methylenebisacrylamide, tetraallyloxyethane, triallylamine and trimethylolpropane triacrylate. Further details of superabsorbers are contained in the book "Modern Superabsorbent Polymer Technology", published by Fredric L. Buchholz and Andrew T. Graham, Verlag Wiley—VCH (1998).

The above-listed cellulose derivatives are soluble in water and exhibit a characteristic rheological profile which can be described on the basis of material functions of the aqueous solution of the cellulose derivative. Aqueous solution here means a system which contains water, cellulose derivative and where present, salts and other accompanying materials from the cellulose derivative, e.g. small amounts of sodium chloride and traces of ethylene gylcol and the like together with other solutes in the amount naturally occurring in the water used, for example tap water.

Material functions which are customarily under discussion for describing the flow properties are the viscosity $\eta$ as a function of shear rate $\gamma$, and also the shear storage modulus G' and the shear loss modulus G" in each case as a function of the angular frequency $\omega$ for describing the linear viscoelastic properties. The symbols used here follow the recommendations of the publication: C. L. Sieglaff: "Proposed Nomenclature for Steady Shear Flow and Linear Viscoelastic Behavior", Transactions of the Society of Rheology 20:2 (1976) 311-317.

In the case of viscosity, generally it is not the entire function $\eta$ ($\gamma$) which is reported, but a representative viscosity value which is determined under defined conditions with respect to the concentration of the cellulose derivative in the aqueous solution, the temperature and the shear rate and to the measuring instrument used and the apparatus settings. This procedure is well known to those skilled in the art. Generally, it is also known that in most cases the viscosity of the aqueous solution of a cellulose derivative decreases with increasing shear rate; the aqueous solutions thus have a pseudoplastic flow behaviour.

The linear-viscoelastic properties are determined by measurements in an oscillating shear stream at small amplitude and variable angular frequency. The values for G' and G" are heavily defined here by the concentration of the cellulose derivatives in the aqueous solution and the height of the representative viscosity value. Therefore, hereinafter, only the relative course of G' and G" with increasing angular frequency $\omega$ is considered. At a concentration of 1.5 to 2 parts by weight of cellulose derivative per 100 parts by weight of the aqueous solution and a temperature of approx. 20° C., the course of G' and G" for the cellulose derivatives of the prior art is such that at low angular frequency $\omega$, the shear storage modulus G' is less than the shear loss modulus G", but with increasing anular frequency, G', however, increases more than G". Here, the case can also occur that G', above a certain angular frequency, finally becomes greater than G"; the solution, at high values of angular frequency, thus reacts predominantly elastically.

For conventional cellulose derivatives, in aqueous solution, the dependence on the angular frequency, therefore, is markedly greater for G' than for G"; in particular, the linear-viscoelastic material functions shear storage modulus G' and shear loss modulus G", in the range of angular frequency $\omega$ from 0.1 s$^{-1}$ to 1 s$^{-1}$, depend on the anular frequency in such a manner that the exponents n and m of the relationships (1) G'$\propto \omega^n$ (shear storage modulus is proportional to the angular frequency to the power of n) and (2) G"$\propto \omega^m$ (shear loss modulus is proportional to the angular frequency to the power of m)

differ markedly, where for the cellulose ethers alone, the ratio of n to m is customarily greater than 1.20.

It could first be supposed that the mixtures of cellulose ether and superabsorber in aqueous solution have gel-like rheological properties. However, this is not necessarily the case, although the viscoelastic properties are markedly affected by adding superabsorbers.

The term "gel-like rheological properties" is here defined by the dependence of the linear-viscoelastic material functions shear storage modulus G' and shear loss modulus G" on the angular frequency $\omega$, following the definition of the "gel point" known from work by Chambon and Winter [see: F. Chambon, H. H., Winter: "Linear Viscoelasticity at the Gel Point of a Crosslinking PDMS with Imbalanced Stoichiometry", Journal of Rheology 31 (8) (1987) 683-697]; where the gel point is described as the point where the frequency dependency for G' and G" can be described by the relationships:

(1) G'$\propto \omega^n$ (shear storage modulus is proportional to the angular frequency to the power of n) and (2) G"$\propto \omega^m$ (shear loss modulus is proportional to the angular frequency to the power of m)

and the exponents n and m are equal, or the ratio of n to m reaches a value of 1. The values of G' and G" can differ here as it is of importance here only that the logarithm of G' and the logarithm of G", in each case plotted against the logarithm of $\omega$, have the same gradient, with only the range of angular frequency $\omega$ of 0.1 s$^{-1}$ to 1 s$^{-1}$ being considered.

Corresponding values for the ratio of n to m for solutions of the mixtures of cellulose ether and superabsorber are given in the examples; here, in each case solutions in water or 2% strength by weight of sodium hydroxide solution were studied at 20° C. which contained in total 1.5 parts of the mixture per 100 parts of solution. Obviously, the rheological behaviour of the solutions, despite the crosslinked component, does not correspond to the gel-like behaviour according to the definition given above.

The superabsorbers need not be mixed separately with the cellulose ethers, but can also be mixed in situ separately with the other mortar constituents.

The invention further relates to a process for the extrusion of mineral masses with admixture of the above-described cellulose ether composition to the extruded mass. Subject-matter of the invention here is a process for the extrusion of mineral masses, characterized in that an inventive cellulose ether composition is admixed as additive with 0.1-6% by weight of a mineral mixture comprising 20-100 parts of binder, 0-70 parts of aggregates, 0-30 parts of lightweight aggregates, 0-20 parts of fibres and possibly other additives, with water and mixed and/or kneaded until a homogeneous mass is obtained and this mass is extruded through a die mouth of an extrusion press.

The inventive process is carried out by mixing all raw materials in any sequence with one another. Generally, all dry components are first premixed dry, then admixed with a defined amount of water and remixed. However, it is also possible to admix the dry materials with an aqueous solution of the additive (plasticizer) or to admix all components and the water simultaneously. It is likewise possible to add a portion or all of the sands/aggregates having a moisture content of less than 10%. After all components have been mixed with one another, they are then compressed in a single- or twin-screw extruder and pressed through a die. It is possible to use extruders with and without vacuum chamber and extruders with or without cooling. Between mixing and extrusion, a kneading step in a commercially conventional kneader can also be provided.

The extrusion temperature here is 30-65° C., in particular 45-65° C., in which case a surface quality very good for this temperature range was achieved. Particularly preferably, the temperature range is 60 to 65° C.

The invention further relates to a process for producing a cellulose ether composition which is used as additive for the invention. For Examples 2 and 3, a superabsorber (SAP) based on the monomers: acrylic acid/potassium acrylate was used, for Examples 5 and 6 a superabsorber based on sodium polyacrylate was used.

| Example No. | Cellulose ether composition | n/m (Ratio of the rheologically determined exponents) | W/S | Pressure (bar) | Temperature (° C.) | Surface | Overall rating |
|---|---|---|---|---|---|---|---|
| 1 (172DC3) | 100% MHEC | 1.47 (1.51) | 0.29 | 12.2 | 59-61 | Slightly worse than good | + |
| 2 (172DC6) | 97.5% MHEC + 2.5% SAP | 1.40 (1.49) | 0.29 | 11.8 | 61-62 | Slightly worse than good | + to ++ |
| 3 (172DC7) | 95% MHEC + 5% SAP | 1.27 (1.56) | 0.295 | 11.1 | 61-63 | good | ++ |
| 4 (172DC19) | 100% MHEC | 1.47 (1.51) | 0.29 | 13.1 | 58-60 | medium | virtually + |
| 5 (172DC17) | 97.5% MHEC + 2.5% SAP | 1.38 (1.57) | 0.295 | 12.0 | 58 | good | + |
| 6 (172DC18) | 95% MHEC + 5% SAP | 1.44 (1.53) | 0.295 | 12.1 | 58-59 | good | + to ++ |

Notes:
1.) W/S means the water/solids factor. The amount of water used is calculated only from the amounts of sand and cement; fibres and additives are not taken into account. For example, a W/S of 0.29 means that 29 g of water are used per 100 g of sand and cement.
2.) Pressure means the pressure measured closely upstream of the die mouth. The value is averaged over at least six measurements.
3.) The overall rating is between ++ (=very good) and – (=very poor).
4.) Values of the exponent ratio n/m: data for solutions of the mixtures of cellulose ether and superabsorber in water, values in brackets for solutions in a solvent of 98 parts by weight of water and 2 parts by weight of sodiumhydroxide per 100 parts by weight of solvent. The solutions contained in each case 1.5 parts by weight of the mixtures and 98.5 parts by weight of solvent.
5.) All of the methylcelluloses denoted "MHEC" are methyl hydroxyethylcelluloses having a viscosity of 75-85 000 mPas, measured at 20° C. in a 2% strength solution in a Haake rotary viscometer.

extrusion of mineral masses, characterized in that 70-99.9% of cellulose ether is mixed with 0.1-30% of superabsorbent polymer and if appropriate further additives in the dry or pasty/gel-like state.

The invention further relates to the use of a cellulose ether composition as additive for the production of cement-bonded shaped bodies by extrusion.

The invention is further illustrated but is not intended to be limited by the following examples in which all parts and percentages are by weight unless otherwise specified.

EXAMPLES

The examples hereinafter are to illustrate the inventive use without restricting the invention:

Carrying out the mixing and extrusion: 50 parts of Portland cement CEM I 32,5R, 50 parts of quartz sand, 5 parts of fibres and 0.9 parts of cellulose ether composition (all parts heated) are first mixed homogeneously dry in a fluidized-bed mixer, then heated water (see below for quantities) is added, the mass is further mixed and kneaded for some minutes in a kneader (manufacturer Brabender, Germany). The mass is then immediately charged into the feed trough of the heated single-screw extruder (manufacturer Händle, Mühlacker, Germany). The mass is pressed through a perforated plate and conducted through the vacuum chamber for degassing, pressed through a profile die and discharged onto a conveyor belt. All extruded masses were set to the same consistency with respect to their water requirement.

Example 1 to 6

The table below gives the results of Examples 1 to 6. Examples 1 and 4 are Comparative Examples of the prior art, Examples 2, 3, 5 and 6 are experiments according to the Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Process for the extrusion of mineral masses, comprising admixing 0.1 to 6% by weight of a cellulose ether composition which comprises 90.1 to 99.8% by weight of cellulose ether and 0.2 to 9.9% of a superabsorbent polymer selected from the group consisting of partially neutralized and crosslinked polyacrylic acids, (partially) neutralized starch-acrylic acid graft copolymers, (partially) saponified vinyl acetate-acrylic ester copolymers, and polymers of crosslinked cationic monomers, and optionally other additives with a mineral mixture comprising 20 to 100 parts of mineral binder, 0 to 70 parts of aggregates, 0 to 30 parts of lightweight aggregates, 0 to 20 parts of fibres and optionally other additives, and water, mixing and/or kneading until a homogeneous mass is obtained, and extruding the mass through a die mouth of an extrusion press, with the proviso that the extruded mineral extrusion mass does not comprise a polyacrylamide.

2. The process of claim 1, wherein the cellulose ether composition comprises ionic cellulose ethers selected from the group consisting of carboxymethylcellulose, sulphoethylcellulose and salts thereof or comprises a non-ionic cellulose ethers selected from the group consisting of methylcellulose, methyl hydroxyethylcellulose, methyl hydroxypropyl-cellulose, hydroxyethylcellulose, ethyl hydroxyethylcellulose, methyl ethyl hydroxyethylcellulose, methyl hydroxyethyl hydroxybutylcellulose and mixtures thereof.

3. The process of claim 1, wherein the superabsorbent polymer is crosslinked and swellable but insoluble in water.

4. The process of claim 1, in which the mineral masses are cement-bonded, gypsum-bonded, dry hydrated lime-bonded, silicate-bonded, fly ash-bonded, clay-bonded or ceramic masses.

5. Process according to claim 1, further comprising maintaining the temperature of the mass to be extruded at the die mouth from 30 to 65° C.

6. The process of claim 1 wherein the extruded mineral mass comprises 0.1 to 6% by weight of said cellulose ether composition,
20 to 100 parts of a mineral binder,
0 to 70 parts aggregates,
0-30 parts light weight aggregates,
0-20 parts of fibers and water.

7. The process of claim 2, wherein the superabsorbent polymer comprises a partially neutralized and crosslinked polyacrylic acid.

8. The process of claim 4 wherein the superabsorbent polymer comprises a partially neutralized and crosslinked polyacrylic acid.

* * * * *